(12) United States Patent
Kantawala et al.

(10) Patent No.: US 11,252,083 B2
(45) Date of Patent: Feb. 15, 2022

(54) DATA PACKET FORWARDING IN AN NGSO SATELLITE NETWORK

(71) Applicant: LOCKHEED MARTIN CORPORATION, Bethesda, MD (US)

(72) Inventors: Anshul Deepak Kantawala, Frederick, MD (US); Dilip Shyamsundar Gokhale, Germantown, MD (US); Piya Seth Bhaskar, North Potomac, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/783,051

(22) Filed: Feb. 5, 2020

(65) Prior Publication Data

US 2020/0259739 A1    Aug. 13, 2020

Related U.S. Application Data

(60) Provisional application No. 62/802,647, filed on Feb. 7, 2019.

(51) Int. Cl.

| H04L 12/703 | (2013.01) |
|---|---|
| H04B 7/195 | (2006.01) |
| H04L 12/24 | (2006.01) |
| H04L 12/803 | (2013.01) |
| H04L 12/66 | (2006.01) |
| H04L 12/751 | (2013.01) |
| H04L 12/851 | (2013.01) |
| H04L 12/707 | (2013.01) |
| H04L 45/28 | (2022.01) |

(Continued)

(52) U.S. Cl.
CPC ............ H04L 45/28 (2013.01); H04B 7/195 (2013.01); H04L 12/66 (2013.01); H04L 41/0668 (2013.01); H04L 45/02 (2013.01); H04L 45/22 (2013.01); H04L 47/125 (2013.01); H04L 47/24 (2013.01)

(58) Field of Classification Search
None
See application file for complete search history.

(56) References Cited

U.S. PATENT DOCUMENTS

| 9,763,167 | B2 * | 9/2017 | Gopal | H04W 40/246 |
| 10,707,952 | B2 * | 7/2020 | Dankberg | H04B 7/18515 |

(Continued)

*Primary Examiner* — Gregory B Sefcheck
*Assistant Examiner* — Suk Jin Kang
(74) *Attorney, Agent, or Firm* — Morgan, Lewis & Bockius LLP

(57) ABSTRACT

A communication system includes a satellite constellation, one or more gateways and a network controller. The satellite constellation includes multiple satellites to facilitate communication between a number of user terminals (UTs). Each gateway communicates with one or more of the satellites. The network controller controls operation of the satellites, the gateways and the UTs. The satellites, the UTs, the gateways and the network controller include hardware that may also be software-defined network (SDN) enabled to ensure a persistent end-to-end data packet forwarding including proactive updates and reactive updates to forwarding tables. The proactive updates handle deterministic and time-synchronized link connectivity changes and the reactive updates handle ad hoc link connectivity changes.

19 Claims, 8 Drawing Sheets

(51) Int. Cl.
   *H04L 41/0668* (2022.01)
   *H04L 47/125* (2022.01)
   *H04L 45/02* (2022.01)
   *H04L 47/24* (2022.01)
   *H04L 45/00* (2022.01)

(56) References Cited

U.S. PATENT DOCUMENTS

| | | | | |
|---|---|---|---|---|
| 10,887,132 B2* | 1/2021 | Li | | H04L 12/6418 |
| 2003/0050008 A1* | 3/2003 | Patterson | | H04B 7/18578 |
| | | | | 455/12.1 |
| 2009/0154391 A1* | 6/2009 | Wittenschlaeger | | H04B 7/19 |
| | | | | 370/316 |
| 2012/0059934 A1* | 3/2012 | Rafiq | | H04L 67/1002 |
| | | | | 709/225 |
| 2013/0223226 A1* | 8/2013 | Narayanan | | H04L 49/25 |
| | | | | 370/236 |
| 2014/0064080 A1* | 3/2014 | Stevens | | H04L 47/2483 |
| | | | | 370/235 |
| 2016/0037434 A1* | 2/2016 | Gopal | | H04L 45/02 |
| | | | | 370/316 |
| 2017/0041830 A1* | 2/2017 | Davis | | H04B 7/18521 |
| 2017/0078176 A1* | 3/2017 | Lakshmikantha | | H04L 47/562 |
| 2018/0084476 A1* | 3/2018 | Kay | | H04B 7/195 |
| 2018/0167321 A1* | 6/2018 | Foxworthy | | H04L 61/1511 |
| 2018/0241664 A1* | 8/2018 | Singh | | H04L 63/105 |
| 2018/0309664 A1* | 10/2018 | Balasubramanian | | H04L 45/22 |
| 2018/0316429 A1* | 11/2018 | Barritt | | H04B 10/1129 |
| 2018/0343054 A1* | 11/2018 | Barritt | | H04B 7/18504 |
| 2019/0159106 A1* | 5/2019 | Jin | | H04W 64/00 |
| 2019/0372658 A1* | 12/2019 | Barritt | | H04L 45/021 |
| 2019/0393957 A1* | 12/2019 | Barritt | | H04B 10/1129 |
| 2020/0120018 A1* | 4/2020 | Taveira | | H04L 45/24 |
| 2020/0153737 A1* | 5/2020 | Foxworthy | | H04L 45/245 |
| 2020/0374228 A1* | 11/2020 | Yang | | H04L 45/70 |
| 2021/0013967 A1* | 1/2021 | Barritt | | H04B 10/1129 |
| 2021/0083967 A1* | 3/2021 | Joshi | | H04L 12/2861 |
| 2021/0135749 A1* | 5/2021 | Barritt | | H04B 7/18584 |

\* cited by examiner

DATA PACKET FORWARDING IN AN NGSO SATELLITE NETWORK

CROSS-REFERENCES TO RELATED APPLICATIONS

This application claims benefit of U.S. Provisional Application No. 62/802,647, filed on Feb. 7, 2019, which is incorporated herein by reference in its entirety.

STATEMENT REGARDING FEDERALLY SPONSORED RESEARCH OR DEVELOPMENT

Not Applicable.

FIELD OF THE INVENTION

The present invention generally relates to satellite communication and, more particularly, to data packet forwarding in a non-geosynchronous orbit (NGSO) satellite network.

BACKGROUND

Non-geosynchronous orbit (NGSO) satellite networks have the potential to provide very high throughput, low-delay services to end-users, allowing them to effectively complement or even compete with the terrestrial fiber and the wireless service offerings. However, end-to-end, hop-by-hop data packet forwarding in an NGSO satellite network is extremely challenging given the dynamic nature of the satellite constellation. There is a continually changing relationship between satellites and user-terminals, satellites and gateways, as well as user-terminals and gateways (in NGSO constellations where the payload performs no processing or partial processing). This continually changing relationship requires the frequent updating of forwarding tables. The network dynamism is further accentuated in NGSO constellations, which use satellite cross-links and on-board processing.

For such constellations, forwarding tables also need to be updated to account for changes in cross-link connectivity and changes in best paths between source and destination end-points. Mobile user-terminals, which change satellite connectivity based on changes in terminal location, further heighten the problem of asynchronously updating forwarding tables. Finally, the large scale associated with typical NGSO networks being envisaged (e.g., including hundreds to thousands of satellites, hundreds of gateways, and millions of end-user terminals) makes the data packet forwarding challenge truly challenging. The scale aspects are of concern to both the size of forwarding tables, especially on satellites that have limited on-board memory, as well as the amount of network bandwidth (capacity) needed for updating the forwarding tables at each network node.

SUMMARY

According to various aspects of the subject technology, methods and systems are disclosed for ensuring persistent end-to-end data packet forwarding in a non-geosynchronous orbit (NGSO) network. Key attributes of the subject solution are (a) proactive updates to the forwarding tables to deal with deterministic, time-synchronized link connectivity changes and (b) reactive updates to the forwarding table to deal with ad hoc link connectivity changes.

In one or more aspects, a communication system includes a satellite constellation, one or more gateways and a network controller. The satellite constellation includes multiple satellites to facilitate communication between a number of user terminals (UTs). Each gateway communicates with one or more of the satellites, if a processing satellite configuration is used, or directly with one or more UTs when the satellite is non-processing or bent-pipe. The network controller controls operation of the satellites, the gateways and the UTs. The satellites, the UTs, the gateways and the network controller include hardware that may also be software-defined network (SDN) enabled to ensure a persistent end-to-end data packet forwarding including proactive updates and reactive updates to forwarding tables. The proactive updates handle deterministic and time-synchronized link connectivity changes, and the reactive updates handle ad hoc link connectivity changes due to events such as user terminal mobility across beams, signal blockages from the user terminal in a specific direction or due to network failure scenarios.

In other aspects, a network controller includes a transceiver circuit and a processor. The transceiver circuit enables the network controller to communicate with one or more satellites of an NGSO satellite constellation, one or more gateways and a number of UTs. The processor controls operation of the satellites, the gateways and the UTs, updates destination tables, transmits updated destination tables to the UTs and transmits updated forwarding tables to the satellites.

In yet other aspects, a method for data packet forwarding in an NGSO satellite network includes using a two-tuple packet addressing header for forwarding data packets from a first UT to a second UT via a number of satellites of the NGSO satellite network. The method also includes using a single-tuple packet addressing header, by forwarding from a UT, data packets originally destined for a first gateway, to a second gateway, via the satellites. The method further includes managing flow tables for the two-tuple address based packet forwarding and the single-tuple address based packet forwarding via a local SDN controller.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description, which includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

In some aspects of the present technology, methods and configuration are disclosed for ensuring persistent end-to-end data packet forwarding in a non-geosynchronous orbit (NGSO) network. Key attributes of the subject solution are (a) proactive updates to the forwarding tables to deal with deterministic, time-synchronized link connectivity changes, and (b) reactive updates to the forwarding table to deal with ad hoc link connectivity changes. The key benefits of the disclosed solution are the small forwarding table sizes at the core network nodes and the low network overhead associated with updating the network node forwarding tables. In the disclosed solution, the NGSO network is divided into two domains; 1) a core network, which consists of all gateways and all satellites (when the satellites incorporate on-board processing and cross links); and 2) an access network, which consist of the user terminals (UTs) attached (admitted) to the core network.

Figure 1:
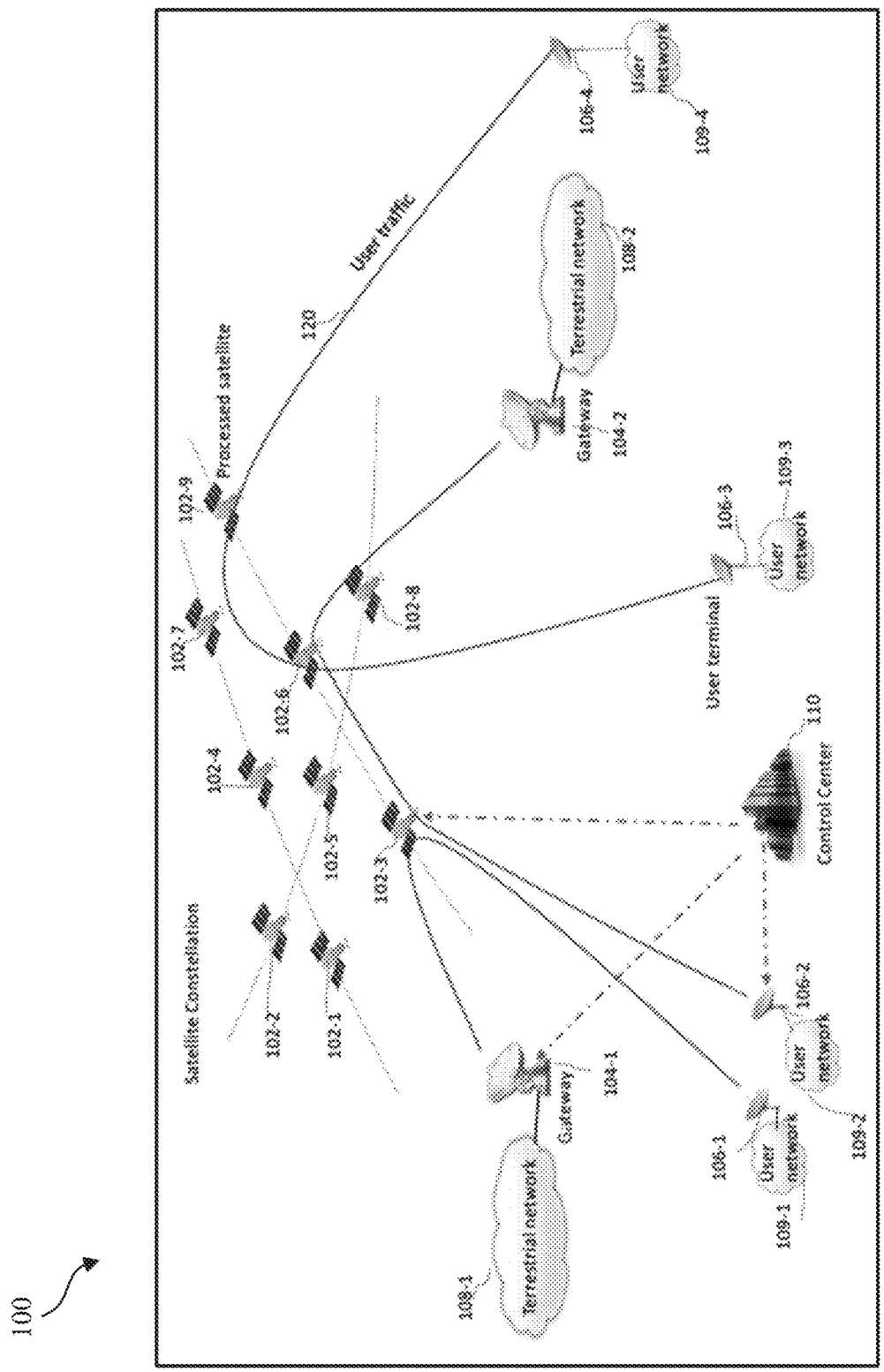
FIG. 1 is a high-level diagram illustrating an example non-geosynchronous orbit (NGSO) satellite network environment, according to certain aspects of the disclosure.

FIG. 1 is a high-level diagram illustrating an example NGSO satellite-network environment 100 that consists of on-board processing satellites according to certain aspects of the disclosure. The example NGSO satellite network environment 100 includes a number of NGSO satellites 102 (hereinafter, "satellites 102," e.g., 102-1, 102-2 . . . 102-9), a number of satellite gateways 104 (hereinafter "gateways 104", e.g., 104-1 and 104-2), multiple UTs 106 (e.g., 106-1, 106-2 . . . 106-4) and a network operation center 110 (hereinafter, "control center 110"). The satellites 102 are members of an NGSO satellite constellation and facilitate communication between the gateways 104 and the UTs 106 as well as between the UTs 106. The communication between the UTs 106 can take place through one or more satellites 102. For example, the UT 106-1 can connect to the gateway 104-13 via the satellite 102-3. The UT 106-2, for instance, can connect to gateway 104-2 via satellites 102-3, and 102-6. The UT 106-3 can connect to UT 106-4 via the satellites 102-6 and 102-9. The gateways 104 are connected to terrestrial networks 108 (e.g., 108-1 and 108-2, such as the Internet). Note that user networks connected to UTs 106 can also be the local Internet or Intranet 109. The control center 110 can control the operations of the satellites 102, gateways 104 and UTs 106. In one or more aspects, the control center 110 may include a transceiver circuit to communicate with the satellites 102, gateways 104, UTs 106 via a "nearby" gateway 104 and a processor. The processor can secure a required end-to-end network capacity to support a CIR by evaluating all time-variant network paths and can enable the UTs 106 and the gateways 104 to perform per-flow QoS enforcement based on the CoS of a respective admitted traffic flow (e.g., 120) to secure a required end-to-end network capacity to support a CIR (e.g., 1 Gbps) by evaluating all time-variant network paths that will be encountered given the dynamic nature of the NGSO constellation.

In some aspects, the satellites 102, the gateways 104, the UTs 106 and the control center 110 include hardware including field-programmable gate array (FPGA) processors and firmware to include one or more algorithms as described below.

Due to the nonstationary aspects of the NGSO satellites in relation to the earth, the UT-to-gateway (e.g., the UT 106-1 to the gateway 104-1, in case of non-processed satellite constellation), UT-to-satellite (e.g., the UT 106-1 to satellite 102-3), gateway-to-satellite (e.g., the gateway 104-1 to satellite 102-3) and satellite-to-satellite (e.g., the satellite 102-1 to satellite 102-4) connectivity is continually changing. A nonprocessed satellite is a satellite that does not implement any modem or packet switching functionality and serves in a bent-pipe mode. The nonstationary aspects of the NGSO satellites require frequent updating of the forwarding tables. The network dynamism is further accentuated in NGSO constellations, which use satellite cross-links and on-board processing.

For such constellations, forwarding tables also need to be updated to account for changes in cross link connectivity and changes in best paths between source and destination end-points. Mobile user-terminals, which change satellite connectivity based on changes in terminal location, further accentuate the problem of asynchronously updating forwarding tables. Further, the large scale associated with typical NGSO networks being envisaged makes the data packet forwarding truly challenging. The scale aspects are of concern to both the size of forwarding tables, especially on satellites that have limited on-board memory, as well as the amount of network bandwidth (capacity) needed for updating the forwarding tables at each network node. These challenges are overcome by the system of the subject technology, as discussed in more detail herein.

The subject solution, as implemented within the system 200, includes two main functionalities. The first functionality includes forwarding in the core network. The second functionality includes detecting and automatically resolving service degradations. The first functionality is based on deterministic changes in the core network topology and changes in UT-to-satellite (for cases where the NGSO satellites incorporate on-board processing) or terminal-to-gateway (in the case of non-processed NGSO constellation). The first functionality also includes addressing nondeterministic changes due to mobile UTs. The second functionality addresses automated handling of service degradations due to recurring blockage or traffic congestion in the network.

The first functionality of the system 200, which includes forwarding in the core network, involves three main aspects: a) hierarchical two-tuple based forwarding, b) centralized time-based route computation, and c) a local SDN controller, on the satellite and edge-nodes such as user terminals and gateways, that manages flow tables. The aspect in part a allows for smaller forwarding table within the core satellite network and, correspondingly, the ability to make low complexity and fast packet forwarding decisions. The aspects in parts b and c ensure that the bandwidth utilized for packet forwarding tables is minimized, with route computation performed on the ground. These aspects are described in more detail herein.

Figure 2:
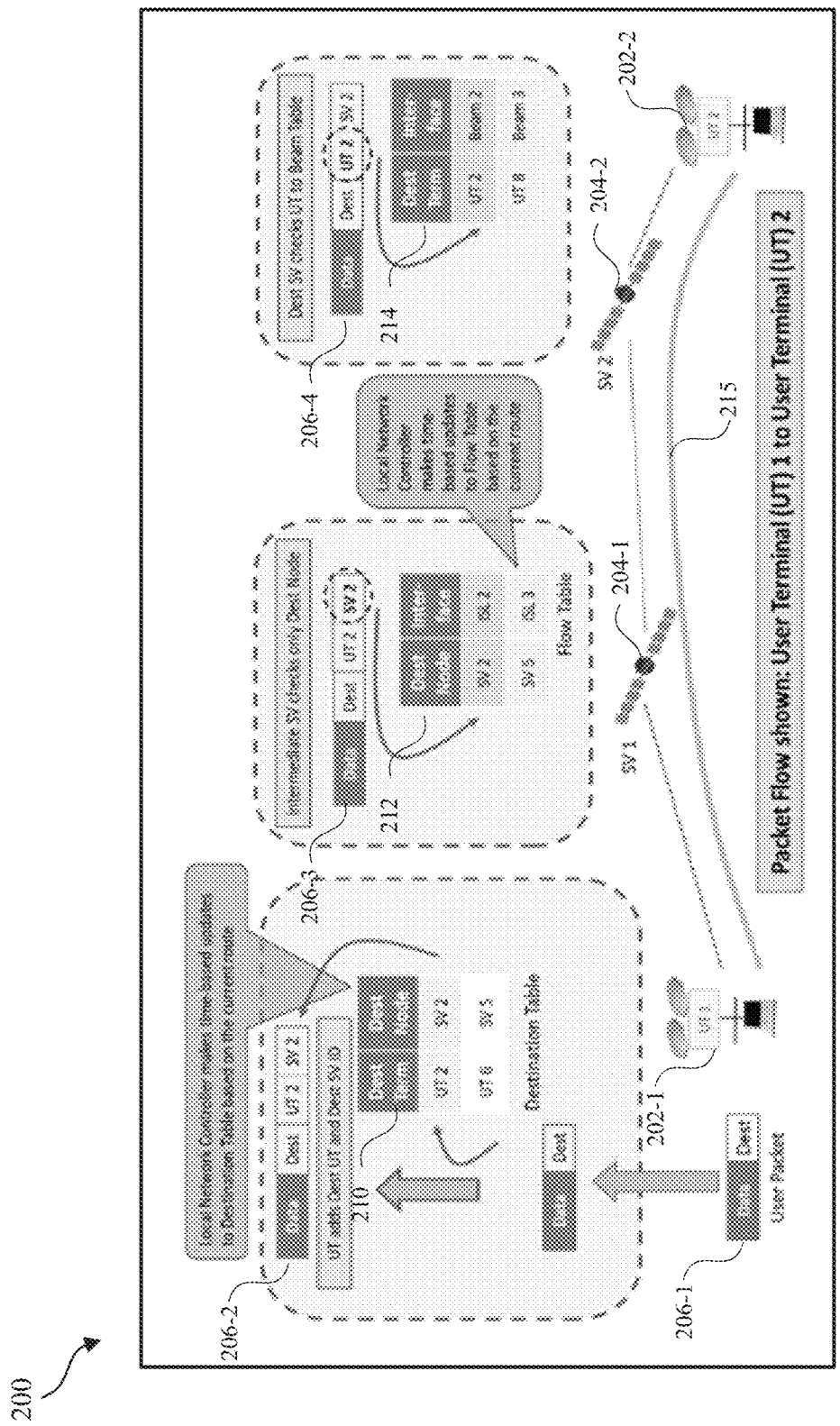
FIG. 2 is a schematic diagram illustrating an example system for implementing a two-tuple packet-forwarding algorithm between two user terminals (UTs), according to certain aspects of the disclosure.

FIG. 2 is a schematic diagram illustrating an example system 200 for implementing a two-tuple packet forwarding algorithm between two user terminals (UTs) 202, according to certain aspects of the disclosure. The example system 200 includes UTs 202 (202-1 and 202-2) and two satellites (also referred to space vehicle (SV)) 204 (204-1 and 204-2), which are in communication with a local network controller (e.g., central controller 110 of FIG. 1). The local network controller, along with the UTs 202 and the satellites 204 are responsible for executing the two-tuple packet forwarding algorithm between two UTs 202. The two-tuple packet forwarding algorithm starts with the local network controller making time-based updates to a destination table 210 in the UT 202-1. The UT 202-1 (UT1) then updates the user packet 206-1 (including a data portion and a destination (Dest) portion) based on the updated destination table 210. In the updated destination table 210, the Dest terminal (Dest Term) and the Dest node (Dest Node) are indicated to be UT2 and satellite 204-2 (SV2), respectively. The updated packet 206-2, includes a duplet address vector <UT2, SV2> compatible with updated destination table 210 and is forwarded to the satellite 204-1.

The user packet 206-1 is programmed by the local network controller to pass through a route 215, which consists of satellites 204-1 (SV1) and 204-2 (SV2) to reach UT 202-2 (UT2). In satellite 204-1, the forwarding table (flow table) 212 is updated based on the current route by the local network controller, based on the current route 215, to include SV2 and inter-satellite link (ISL) 2 as the Dest Node and Interface, respectively. The satellite 204-1 updates the address portion of the date packet 206-2 received from the UT 202-1 to produce a packet 206-3, which includes UT2 and SV2 in its address portion and is forwarded to the satellite 204-2. In satellite 204-2, the forwarding table 214 is updated by the local network controller, based on the current route 215, to include UT2 and beam 2 as the Dest Term and the Interface, respectively. Beam 2 is the link between the satellite 204-2 and the UT 202-2. The satellite 204-2 changes the address portion of the data packet received from satellite 204-1 to produce a data packet 206-4, having an address portion including UT2 and SV2, which is sent through beam 2 to the UT 202-2 (UT2). It is noted that in a scenario where the connection is terminated in a UT (such as the scenario of FIG. 2), the address portion of the data packet includes the terminal identification (Term ID) if the destination terminal (e.g., UT2) and the satellite ID (SV ID) of the satellite (e.g., SV2) currently serving the destination terminal.

Figure 3:
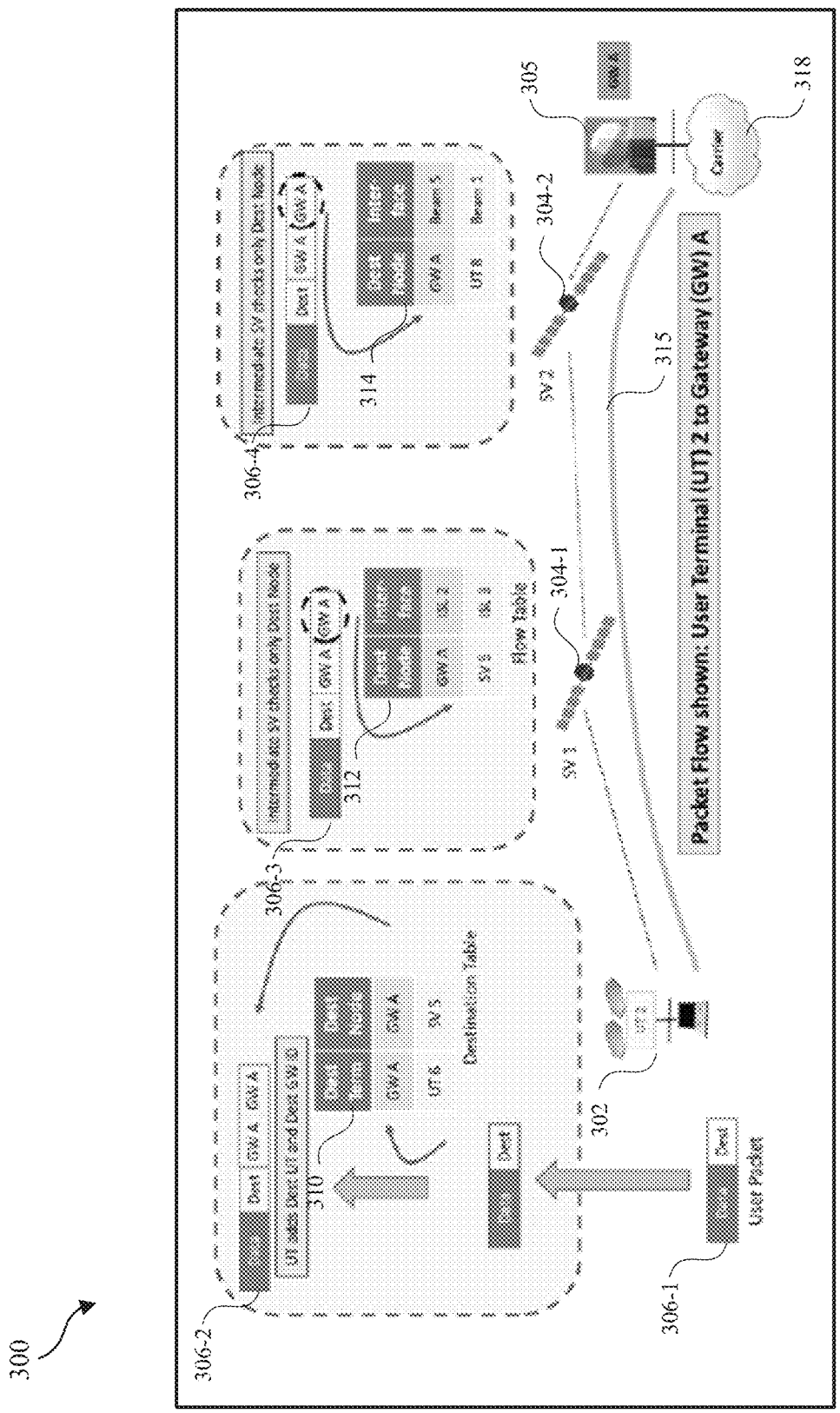
FIG. 3 is a schematic diagram illustrating an example system for implementing a two-tuple packet forwarding algorithm between a UT and a gateway, according to certain aspects of the disclosure.

FIG. 3 is a schematic diagram illustrating an example system 300 for implementing a two-tuple packet-forwarding algorithm between a UT and a gateway, according to certain aspects of the disclosure. The example system 300 includes UT 302 (UT2), two satellites 304 (304-1 and 304-2) and a gateway 305 (GW A), which are in communication with a local network controller (e.g., central controller 110 of FIG. 1). The local network controller, along with the UT 302, satellites 304 and the gateway 305 are responsible for executing the two-tuple packet-forwarding algorithm between the UT 302 and the gateway 305. The local network controller has selected the route 315 as the best route with the least delay between the UT 302 and the gateway 305, which can connect the user 302 to a terrestrial network (e.g., the Internet) via a carrier 318.

The two-tuple packet forwarding algorithm of FIG. 3 starts with the local network controller making time-based updates to a destination table 310 in the UT 302 and forwarding tables 312 and 314 of satellites 304-1 and 304-2. The address portion of the user packet 306-1 is updated in the UT 302 to the packet 306-2, and in satellites 304-1 and 304-2 to packets 306-3 and 306-4 respectively. In the packets 306-2, 306-3 and 306-4, the destination address is indicated as <GW A, GW A>, where GW A is the node ID of the gateway 305.

It is noted that the satellite 304-1 and 304-2 only check the Dest Node of the flow tables 312 and 314 to update the address portions of the packets 306-3 and 306-4, respectively. Also, the UT and the gateway node IDs are used as subnet addresses and may require layer-2 resolution. Forwarding table entries are limited to the satellite nodes and gateways, which limit the size of the forwarding table. The scalable-size is based on the number of satellites (e.g., many thousands) and gateways (e.g., hundreds or thousands) and can support millions of users.

Figure 4:
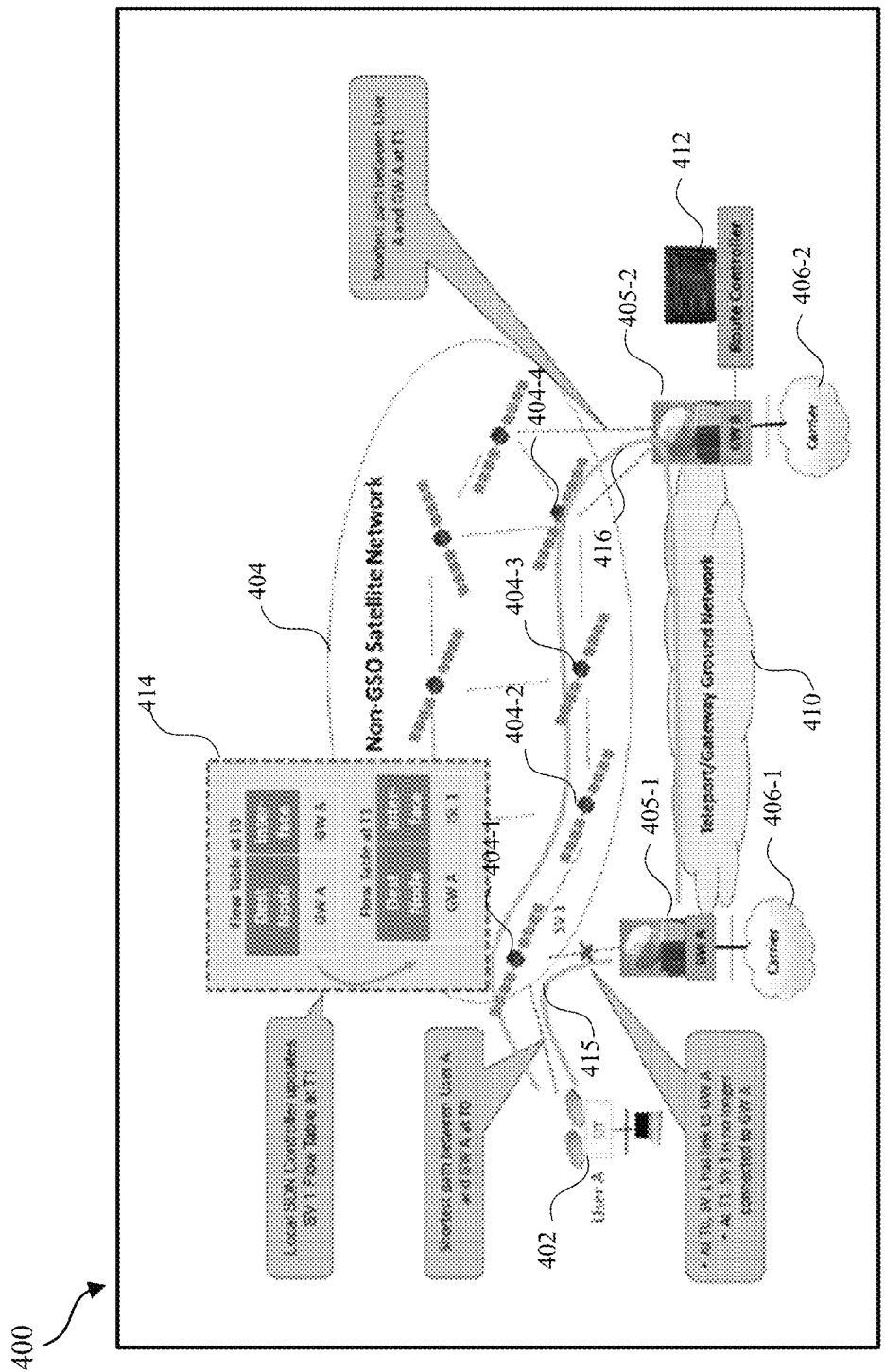
FIG. 4 is a schematic diagram illustrating an example system for implementing a centralized time-based routing algorithm, according to certain aspects of the disclosure.

FIG. 4 is a schematic diagram illustrating an example system 400 for implementing a centralized time-based routing algorithm, according to certain aspects of the disclosure. The example system 400 includes a UT 402, a satellite constellation 404 including satellites 404 (404-1 through 404-4), gateway 405-1 (GW A), 405-2 (GW B) and a route controller 412, which are in communication with a local network controller (e.g., central controller 110 of FIG. 1). At time T0, the satellite 404-1 has an active link with the gateway 405-1, which makes the route 415 between the UT 402 and the gateway 405-1 the shortest path. However, at time T1, the link between the satellite 404-1 and the gateway 405-1 become unavailable, so the route 415 can no longer be used.

It is noted that the routes are computed and updated in a time-synchronized manner based on the admitted flows quality-of-service (QoS) parameters and traffic engineering. Paths are computed for all node pairs, across all network link connectivity changes. Multiple paths between nodes are computed to support differentiated service offerings, and alternate paths are also computed for automated rerouting on link failure. For example, at time T1, a local SDN controller on the satellite 404-1 manages the flow, by updating the forwarding (flow) tables 414. In the updated flow table at T1, the interface field GW A is replaced with ISL 1 to indicate the next destination is a satellite node. Similarly, the flow tables of the satellites 404-2, 404-3 and 404-4 are updated to have the link between the UT 402 and the gateway 405-2 established via the route 416, which is the shortest possible route. The gateway 405 uses services of the route controller 412 to connect to the gateway 405-1 through a teleport and/or gateway ground network 410 (e.g., including fiber optics links) to complete the route 416 between the UT 402 and the gateway 405-1.

Figure 5:
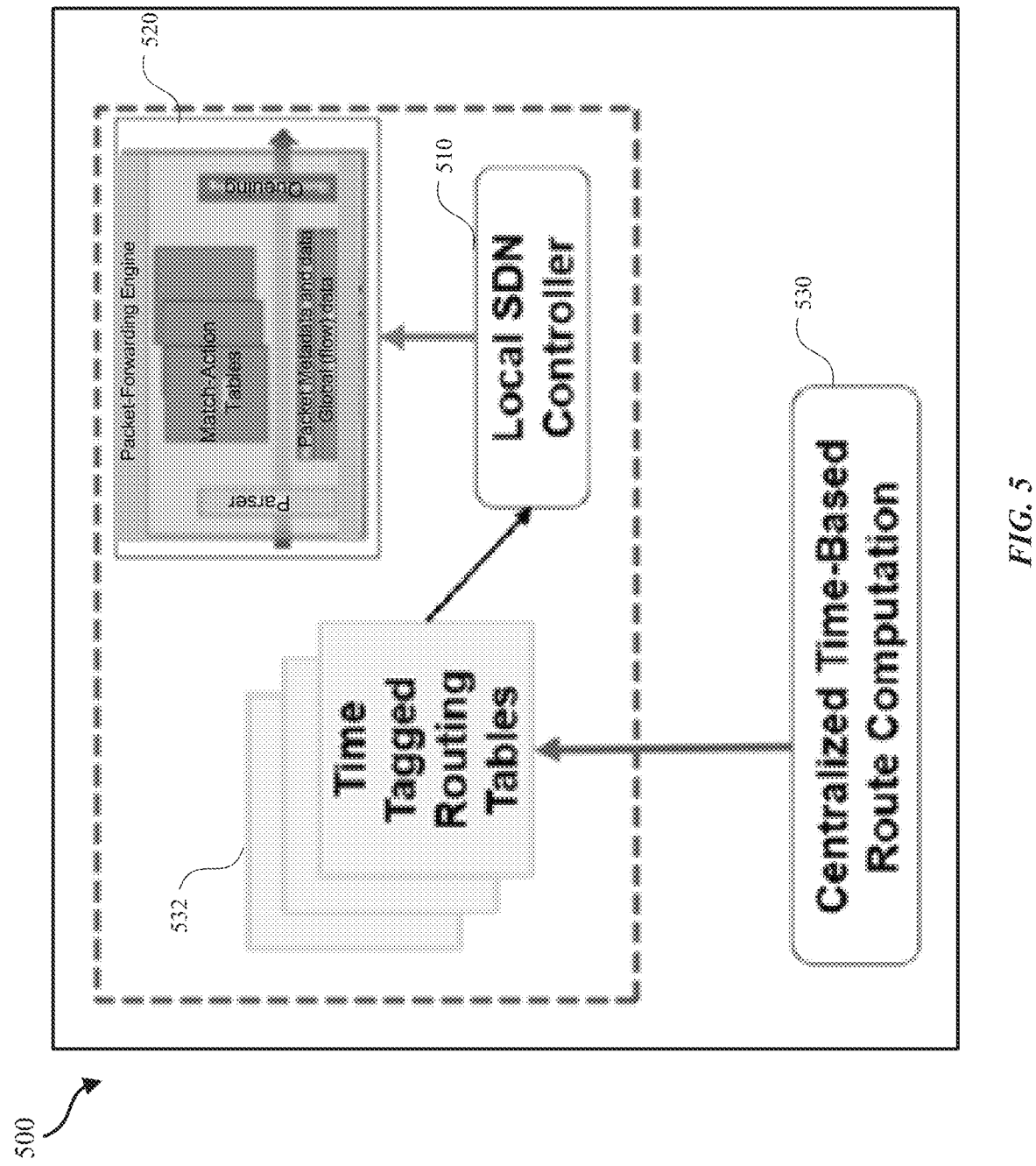
FIG. 5 is a block diagram illustrating an example software-defined network (SDN) framework for packet forwarding, according to certain aspects of the disclosure.

FIG. 5 is a block diagram illustrating an example SDN framework 500 for packet forwarding, according to certain aspects of the disclosure. The example SDN framework 500 includes a local SDN controller 510 and a packet forwarding engine 520. The SDN framework 500 is used in satellites nodes (e.g., satellites 404-1 through 404-4 of FIG. 4) of a processed satellite network to manage distribution and execution of the forwarding tables, as described with respect to FIG. 4. Time-tagged routing tables 532 are generated as the result of centralized time-based route computation 530 performed by the network controller (e.g., 110 of FIG. 1), and are provided to the local SDN controller 510. The local SDN controller 510 uses the services of the packet-forwarding engine 520 for parsing an incoming data packet and queuing the data packet for transmission to the next node in the route defined by the time-tagged routing tables 532. The packet forwarding engine 520 can be implemented in hardware and/or firmware and consists of a number of blocks, including a parsing block, a number of matching-action tables, a packet data and metadata block and a global (flow) data block.

Figure 6:
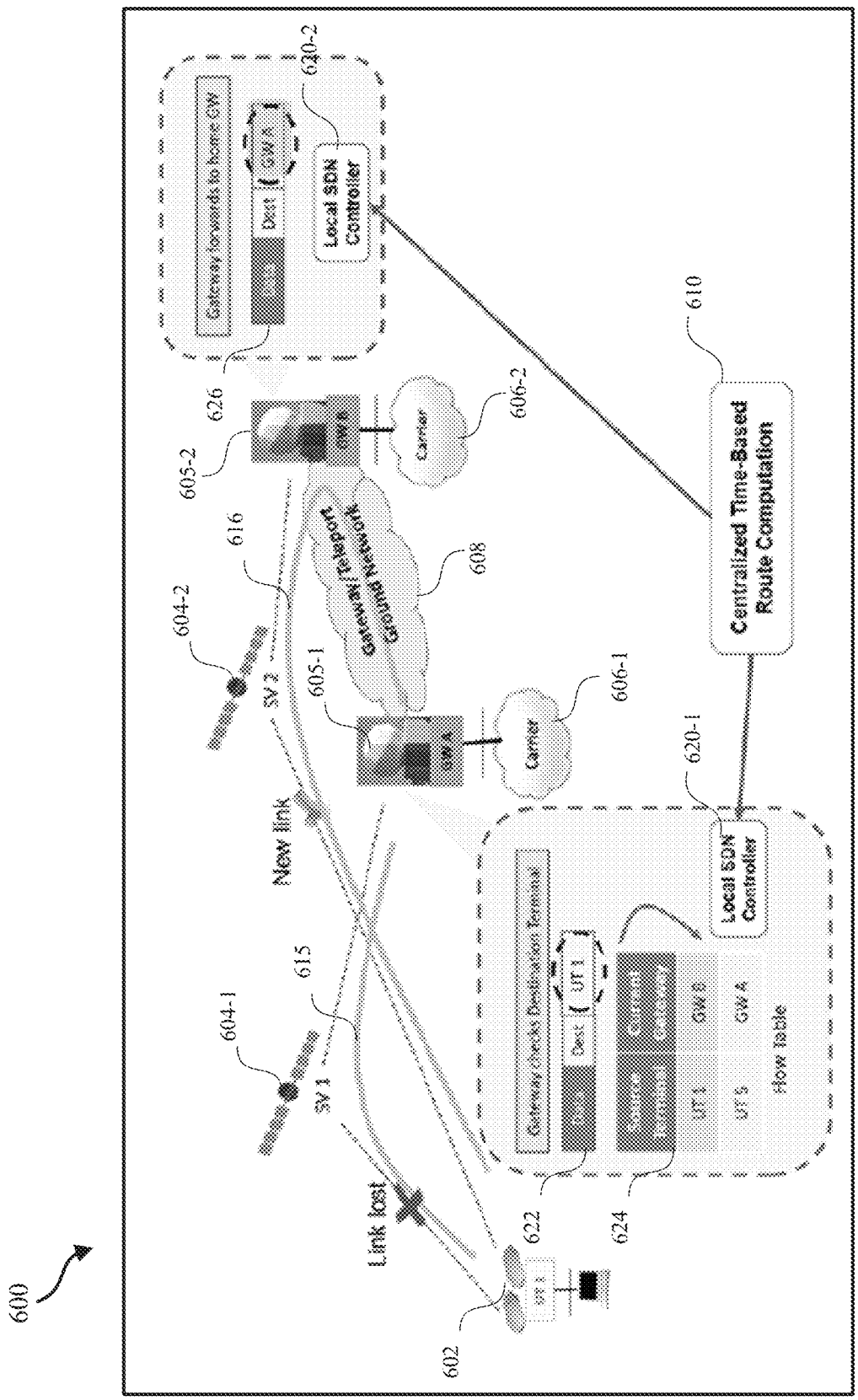
FIG. 6 is a schematic diagram illustrating an example system for implementing a nonprocessed satellite forwarding algorithm after satellite handoff, according to certain aspects of the disclosure.

FIG. 6 is a schematic diagram illustrating an example system 600 for implementing a nonprocessed-satellite forwarding algorithm after satellite handoff, according to certain aspects of the disclosure. The example system 600 includes a UT 602, satellites 604 (604-1 and 604-2), gateways 605 (605-1 and 605-2), carriers 606 (606-1 and 606-2) and local SDN controllers 620 (620-1 and 620-2) at the gateways 605 (605-1 and 605-2), which receive centralized time-based route computation 610 from a network controller (e.g., 110 of FIG. 1). The satellites 604 are nonprocessed satellites, and the gateway 605-1 is a home gateway for the UT 602. For the nonprocessed satellites 604, the forwarding solution is similar to the forwarding solution described above with respect to FIG. 4, except that instead of two-tuple addressing, only single-tuple addressing is used to indicate the destination node. For example, for the return link (UT-to-gateway) traffic, the UT 602 sets the configured home gateway 605-1 as the destination node, and for the forward link (gateway-to-UT) traffic, the home gateway 605-1 sets the user terminal as the destination node.

When the UT 602 moves to the satellite 604-1, which does not directly link to the home gateway 605-1, return link packets reach the gateway 605-2 (visitor gateway) and are then forwarded to the home gateway 605-1 using a terrestrial gateway and/or teleport network 608. Similarly, when the forward link packets for the UT 602, currently served by the gateway 605-2, arrive at the home gateway 605-1, they are forwarded to the gateway 605-2 using a terrestrial gateway and/or teleport network 608. The SDN framework 500 of FIG. 5 is used to manage distribution and execution of the forwarding tables to the gateway and/or teleport locations. Each gateway 605 runs a local SDN controller 620 for forwarding traffic. The local SDN controller 620-1 at the gateway 605-1 checks the destination terminal in the flow table 624 to set the destination address of the data packet 622. Also, the local SDN controller 620-2 at the gateway 605-2 sets the destination address of the data packet 622 to the home gateway 605-1 (GW A).

Figure 7:
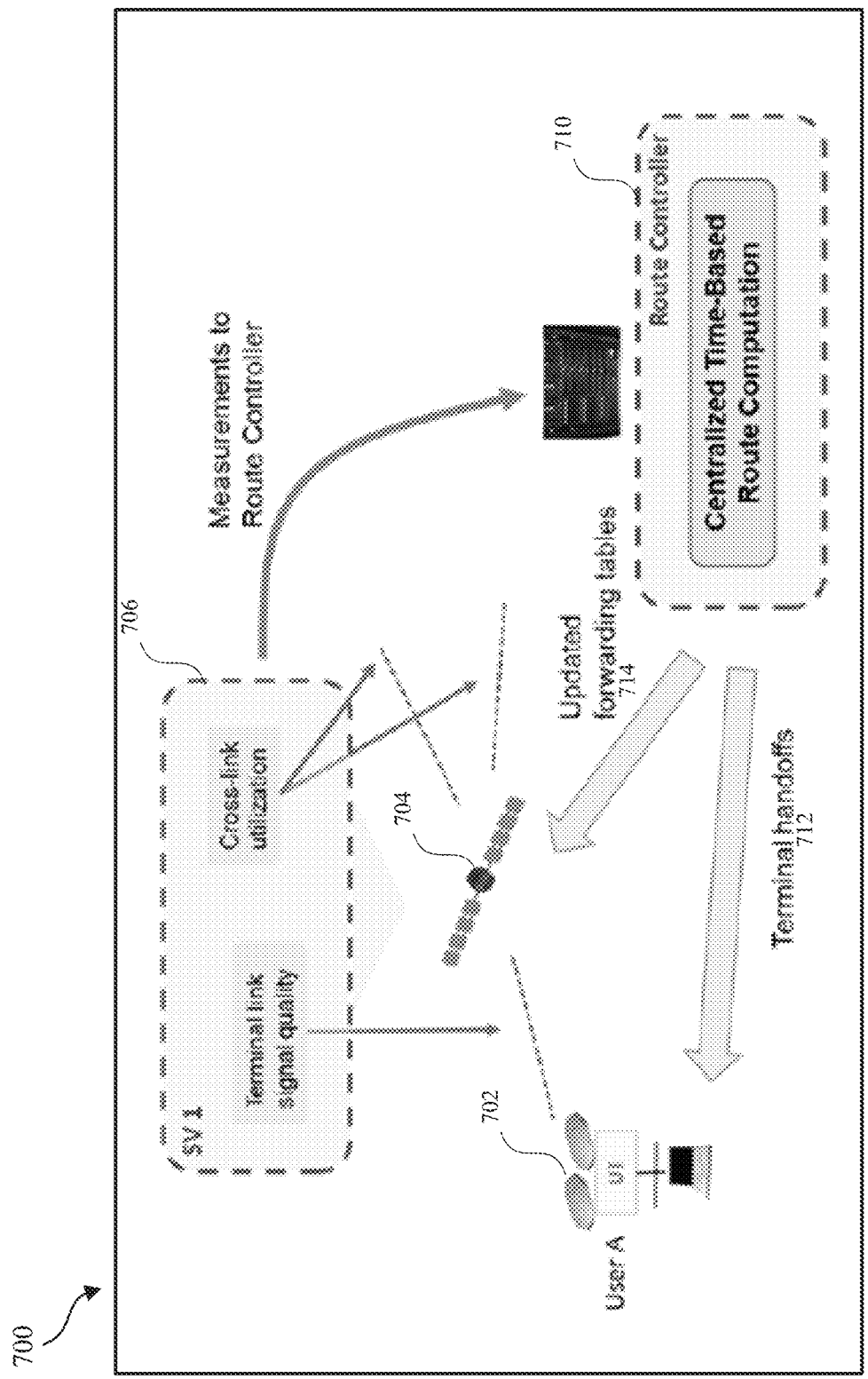
FIG. 7 is a schematic diagram illustrating an example system for implementing measurement-based automated traffic engineering and UT interference handling algorithm, according to certain aspects of the disclosure.

FIG. 7 is a schematic diagram illustrating an example system 700 for implementing measurement-based automated traffic engineering and UT-interference handling algorithm, according to certain aspects of the disclosure. The example system 700 includes a UT 702, a satellite 704 of a satellite constellation and a route controller 710.

This system 700 handles service degradation caused by long-term or recurrent satellite blockage or persistent, predictable traffic congestions. The two key aspects of the solution as implemented by the system 700 are 1) use of long-term traffic patterns to perform traffic engineering; and 2) use of interference data to detect service degradation and automatically move terminals from their planned uplink satellite to a different satellite.

For implementing the traffic engineering and re-routing aspect, each satellite (e.g., satellite 704) is instrumented to provide periodic measurement results 706, including real-time link utilization for all crosslinks and terminal link signal quality, to the route controller 710. The route controller performs big-data analytics on this data to infer traffic trends and congestion hot spots. Based on the trends, core network routing is updated to relieve long-term congestion and updated forwarding tables 714 are sent to the satellite 704.

When implementing interference detection and resolution, in addition to pre-planned handovers due to satellite (e.g., satellite 704) motion, the UT 702 may also undergo unplanned handovers to avoid blockages. The route controller 710 performs big-data analytics on these unplanned handovers to infer predictable satellite blockages for the UT 702. Based on the blockage analysis, the route controller 710 further performs big-data analytics on available location maps (terrain, city, etc.) to identify potential terminal handoffs 712, for sending to the UT 702, to relieve persistent or predictable service degradation. Before the UT 702 is moved to a different satellite (other than the satellite 704), the route controller 710 computes the impact of this ad hoc mobility on the core network. The handoff is only confirmed if it can be accommodated without causing any potential service degradation to existing connections in the core network.

Figure 8:
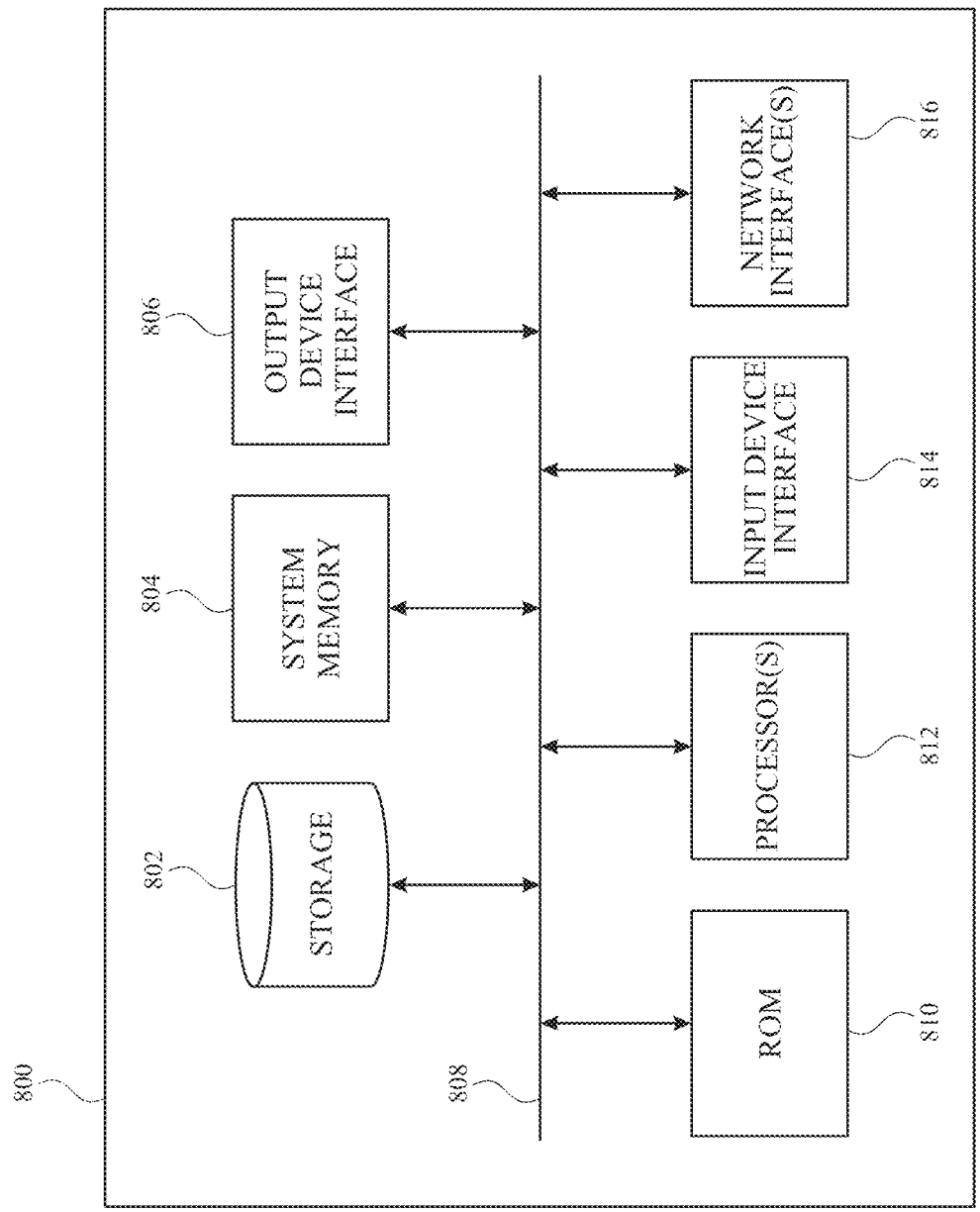
FIG. 8 conceptually illustrates an electronic system with which some aspects of the subject technology can be implemented.

FIG. 8 conceptually illustrates an electronic system 800 with which some aspects of the subject technology can be implemented. The electronic system 800, for example, can be a UT (e.g., UT 106 of FIG. 1), a gateway (e.g., 104 of FIG. 1), a server, a switch, a router, a receiver or any device that can control and/or perform processing of data, including aggregation of data, or generally any electronic device that transmits signals over a network. The electronic system 800 may also be embedded in the NGSO satellites 102 of FIG. 1 and the control center 110 of FIG. 1. Such an electronic system includes various types of computer-readable media and interfaces for various other types of computer-readable media. The electronic system 800 includes bus 808, Processor(s) 812, system memory 804, read-only memory (ROM) 810, permanent storage device 802, input device interface 814, output device interface 806, and network interface 816, or subsets and variations thereof.

Bus 808 collectively represents all system, peripheral, and chipset buses that communicatively connect the numerous internal devices of electronic system 800. In one or more implementations, bus 808 communicatively connects Processor(s) 812 with ROM 810, system memory 804, and permanent storage device 802. From these various memory units, Processor(s) 812 retrieve(s) instructions to execute and data to process in order to execute the processes of the subject disclosure. The Processor(s) 812 can be a single processor or a multicore processor in different implementations.

ROM 810 stores static data and instructions that are needed by Processor(s) 812 and other modules of the electronic system. Permanent storage device 802, on the other hand, is a read-and-write memory device. This device is a nonvolatile memory unit that stores instructions and data even when electronic system 800 is off. One or more implementations of the subject disclosure use a mass-storage device (such as a magnetic or optical disk and its corresponding disk drive) as permanent storage device 802.

Other implementations use a removable storage device (such as a floppy disk or flash drive, and its corresponding disk drive) as permanent storage device 802. Like permanent storage device 802, system memory 804 is a read-and-write memory device. However, unlike storage device 802, system memory 804 is a volatile read-and-write memory, such as random access memory (RAM). System memory 804 stores any of the instructions and data that Processor(s) 812 need(s) at runtime. In one or more implementations, the processes of the subject disclosure, for example, the trained ROM, are stored in system memory 804, permanent storage device 802, and/or ROM 810. From these various memory units, processor(s) 812 retrieve(s) instructions to execute and data to process in order to execute the processes of one or more implementations. In one or more implementations, the processor(s) 812 execute(s) the automatic processes of the subject technology, including executing various algorithms described above with respect to FIGS. 2 through 7.

Bus 808 also connects to input device interface 814 and output device interface 806. Input device interface 814 enables a user to communicate information and select commands to the electronic system. Input devices used with input device interface 814 include, for example, alphanumeric keyboards and pointing devices (also called "cursor-control devices"). Output device interface 806 enables, for example, the display of images generated by electronic system 800. Output devices used with output device interface 806 include, for example, printers and display devices such as a liquid crystal display (LCD), a light-emitting diode (LED) display, an organic LED (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 8, bus 808 also couples electronic system 800 to a network (not shown) through network interfaces 816. In this manner, the computer can be a part of a network of computers (such as a local-area network (LAN), a wide-area network (WAN), or an Intranet, or a network of networks, such as the Internet). Any or all components of electronic system 800 can be used in conjunction with the subject disclosure.

In some aspects, the subject technology may be used in various markets, including, for example, and without limitation, the signal-processing and communications markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range is specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A communication system comprising:
    an NGSO satellite constellation, including a plurality of satellites configured to facilitate communication between a plurality of user terminals (UTs);
    one or more gateways, each gateway configured to communicate with one or more satellites of the plurality of satellites; and
    a network controller configured to control operation of the plurality of satellites, the one or more gateways and the plurality of UTs, wherein an address portion of a data packet in non-processed satellites of the plurality of satellites comprises a single-tuple address that indicates a destination node comprising one of a UT or a gateway, and wherein an address portion of a data packet in processed satellites of the plurality of satellites comprises a two-tuple address comprising an inner address and an outer address, wherein a respective connection terminates in a destination UT and the inner address and the outer address comprise a UT ID associated with the destination UT and a satellite ID, respectively, and wherein the satellite ID is associated with a satellite that is currently serving the destination UT the plurality of satellites, the plurality of UTs, the one or more gateways and the network controller include hardware that ensures a persistent end-to-end data packet forwarding including proactive updates and reactive updates to forwarding tables, wherein the proactive updates are configured to handle deterministic and time-synchronized link connectivity changes and the reactive updates are configured to handle ad hoc link connectivity changes.

2. The communication system of claim 1, wherein the network controller is configured to perform centralized time-based route computation, wherein paths are computed for all node pairs, based on quality-of-service (QoS) parameters of admitted flows and time-varying network-link connectivity and capacity.

3. The communication system of claim 2, wherein the network controller is further configured to compute multiple paths between nodes to support differentiated service offerings and alternate paths for automated re-routing in a link failure.

4. The communication system of claim 1, wherein the plurality of satellites, the plurality of UTs, the one or more gateways and the network controller include hardware that ensures a persistent end-to-end data packet forwarding including proactive updates and reactive updates to forwarding tables, wherein the proactive updates are configured to handle deterministic and time-synchronized link connectivity changes and the reactive updates are configured to handle ad hoc link connectivity changes.

5. The communication system of claim 1, wherein the two-tuple address comprises a first and a second element, wherein a respective connection terminates in a destination gateway and the first and the second elements comprise a gateway ID associated with the destination gateway.

6. The communication system of claim 1, wherein an edge-node including a user terminal or a gateway, is configured to add the two-tuple address to each packet before forwarding the packet in the core network.

7. The communication system of claim 1, wherein an intermediate satellite of the plurality of satellites is configured to use the outer address of the two-tuple address to make a forwarding decision, and wherein a satellite that is currently serving the destination UT is configured to use the inner address of the two-tuple address to make a forwarding decision.

8. The communication system of claim 1, wherein a satellite that is currently serving the destination UT is configured to remove the two-tuple address before forwarding the packet to the destination UT.

9. The communication system of claim 1, wherein the destination gateway is configured to remove the two-tuple address before forwarding the packet to the destination.

10. The communication system of claim 1, wherein a UT of the plurality of UTs is configured to initiate updating of forwarding tables based on a blockage on a radio-frequency (RF) path to an assigned processed satellite or an assigned gateway.

11. The communication system of claim 1, wherein each gateway of the one or more gateways includes a local SDN controller that is configured to communicate with the network controller.

12. A network controller comprising:
a transceiver circuit configured to communicate with one or more satellites of an NGSO satellite constellation, one or more gateways and a plurality of UTs; and
a processor configured to:
control operation of the one or more satellites, the one or more gateways and the plurality of UTs; and
update destination tables, transmit updated destination tables to plurality of UTs, and transmit updated forwarding tables to the one or more satellites
wherein an address portion of a data packet in non-processed satellites of the one or more satellites comprises a single-tuple address that indicates a destination node comprising one of a UT or a gateway, and
wherein an address portion of a data packet in processed satellites of the one or more satellites comprises a two-tuple address comprising an inner address and an outer address, wherein a respective connection terminates in a destination UT and the inner address and the outer address comprise a UT ID associated with the destination UT and a satellite ID, respectively, and wherein the satellite ID is associated with a satellite that is currently serving the destination UT.

13. The network controller of claim 12, wherein the processor is further configured to compute multiple routes between a source node and a destination node and to update the multiple routes in a time-synchronized manner based on quality-of-service parameters associated with admitted flows and traffic engineering.

14. The network controller of claim 13, wherein the source node comprises a UT of the plurality of UTs and destination node comprises another UT of the plurality of UTs or a gateway of the one or more gateways, and wherein the processor is further configured to compute routes for node pairs across an entire network links and for network link connectivity changes.

15. The network controller of claim 12, wherein the processor is further configured to compute routes for node pairs across an entire network links and for network link connectivity changes.

16. The network controller of claim 12, wherein the processor is further configured to compute multiple routes between nodes to support differentiated service offerings, and compute alternate paths for automated rerouting on a link failure.

17. A method for data packet forwarding in an NGSO satellite network, the method comprising:
performing a two-tuple packet forwarding by forwarding data packets from a first UT to a second UT via a plurality of satellites of the NGSO satellite network, wherein an address portion of the two-tuple data packet comprises an inner address and an outer address, wherein a respective connection terminates in a destination UT and the inner address and the outer address comprise a UT ID associated with the destination UT and a satellite ID, respectively, and wherein the satellite ID is associated with a satellite that is currently serving the destination UT;
performing a single-tuple packet forwarding by forwarding from UT data packets originally destined for a first gateway, to a second gateway via a plurality of satellites of the NGSO satellite network, wherein an address portion of the single-tuple data packet comprises an address that indicates a destination node comprising one of a UT or a gateway; and managing flow tables for the two-tuple packet forwarding and the single-tuple packet forwarding via a local SDN controller.

18. The method of claim 17, further comprising:

receiving, time-tagged routing tables received from a network controller based on centralized time-based route computation, and causing a packet forwarding engine to process an incoming data packet and queue a processed data packet for transmission to a next node in a route defined by a forwarding table.

19. The method of claim 17, further comprising:

detecting and automatically resolving service interruptions using long-term traffic patterns to perform traffic engineering; and using interference data to detect service degradation and automatically moving the first UT from a planned uplink satellite to a different satellite of the plurality of satellites, wherein:

detecting comprises receiving measurement results including UT link-signal quality and cross-link utilization from each satellite of the plurality of satellites, and resolving service interruptions comprises sending UT handoffs to the first UT and sending updating forwarding tables to that satellite of the plurality of satellites.

* * * * *